United States Patent [19]

Tsukada et al.

[11] Patent Number: 4,511,418

[45] Date of Patent: Apr. 16, 1985

[54] METHOD OF MAKING A BOTTLE OF SATURATED POLYESTER RESIN

[75] Inventors: Takami Tsukada, Chiba; Masao Akutsu; Tadao Saito, both of Tokyo, all of Japan

[73] Assignee: Yoshino Kogyosho Co., Ltd., Tokyo, Japan

[21] Appl. No.: 540,696

[22] Filed: Oct. 11, 1983

Related U.S. Application Data

[62] Division of Ser. No. 458,352, Jan. 17, 1983, abandoned, which is a division of Ser. No. 245,570, Mar. 20, 1981, abandoned, which is a division of Ser. No. 074,881, Sep. 12, 1979, Pat. No. 9,276,986.

[51] Int. Cl.$^3$ .................... B29C 17/07; B29C 27/18; B29D 9/04
[52] U.S. Cl. .................... 156/245; 264/513; 264/537; 425/523
[58] Field of Search ............. 264/509, 512, 513, 515, 264/516, 523, 537; 425/523; 156/245

[56] References Cited

U.S. PATENT DOCUMENTS

| 2,632,202 | 3/1953 | Haines | 264/541 X |
| 2,792,593 | 5/1957 | Hardgrove, Jr. | 425/526 X |
| 3,503,826 | 3/1970 | Nasica | 264/509 X |
| 4,261,949 | 4/1981 | Spurr et al. | 264/523 X |
| 4,276,986 | 7/1981 | Tsukada et al. | 215/1 C |
| 4,287,150 | 9/1981 | Gendron | 264/509 X |
| 4,323,411 | 4/1982 | Uhlig | 264/509 X |

Primary Examiner—Jan Silbaugh

[57] ABSTRACT

A bottle made of a saturated polyester resin and having one or more strip-shaped projection for the reinforcement and ornament purposes is provided, which bottle is produced by a method comprising the steps of preparing a parison having an opened upper end and a closed bottom end from a saturated polyester resin, welding a strip-shaped piece made of the same saturated polyester resin on said parison so as to extend in the vertical direction, and then biaxially orientating said parison and said strip-shaped piece as an integral body.

4 Claims, 4 Drawing Figures

METHOD OF MAKING A BOTTLE OF SATURATED POLYESTER RESIN

This is a division of application Ser. No. 458,352, filed Jan. 17, 1983, now abandoned, which was a division of application Ser. No. 245,570 filed Mar. 20, 1981, now abandoned, which in turn is a division of application Ser. No. 074,881 filed Sept. 12, 1979, now U.S. Pat. No. 4,276,986.

BACKGROUND OF THE INVENTION

The present invention relates to a bottle made of a saturated polyester resin provided with a vertically extending, strip-shaped projection on the trunk thereof.

The saturated polyester resins attract public attention for use as the materials for bottles, since they prevent soaking of any harmful materials such as solvent differing from other synthetic resinous materials conventionally used for making bottles and no poisonous gas is generated when combusted after disposal. However, melted saturated polyester resin is poorer or defficient in fluidity as compared to other meltable materials and tends to gelatinize to make it difficult to mold therefrom a bottle of complicated contour and to form an embossed pattern on the outer face of the bottle.

Further, the parison made of a saturated polyester resin in crystallized at the glass transition temperature due to the interrelation between the temperature and the time to lose its elongation capacity. As a result, it is necessary to maintain the temperature within an appropriate image if the parison made of a saturated polyeser resin is biaxially orientated and it is extremely difficult effect the desired biaxial orientation particularly when the thickness of the parison is varied in parts.

OBJECT OF THE INVENTION

The object of the invention is to provide a bottle made of a saturated polyester resin which has thin trunk portion with the part being projected to form vertically extending, strip-shaped projection or land which reinforces the trunk of thin bottle and concurrently forms a convex pattern. A further object of the invention is to enable to form such strip-shaped projection on the face of the bottle by welding a strip to the parison thereby to easily mold an embossed portion on the bottle.

BRIEF DESCRIPTION OF THE INVENTION

DETAILED DESCRIPTION OF THE INVENTION

Figure 1:
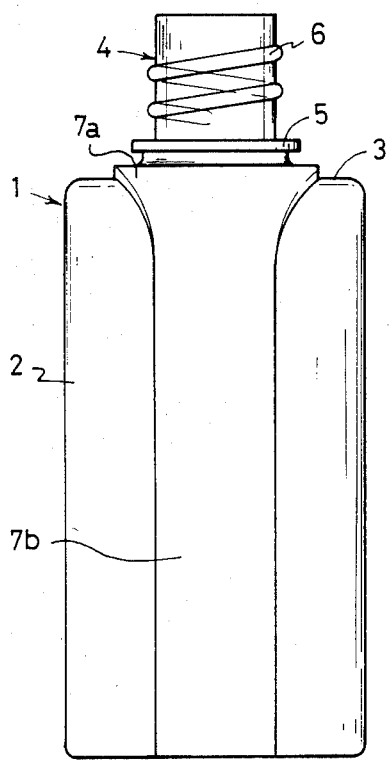
FIG. 1 is a front view of a bottle made of a saturated polyester resin according to the present invention.

The bottle of a saturated polyester resin according to the present invention will be described with reference to the appened drawing. A bottle 1 comprises a trunk 2 rising up from the periphery of the bottom of the bottle, a shoulder 3 at the upper end of the trunk 2, and a neck 4 projecting at the center of the shoulder 3 having the diameter smaller than that of the trunk. From the base portion of the neck 4 projected is an outwardly facing flange 5 agaist which the bottom edge of a cap is abutted. A thread 6 for meshing with the corresponding thread of the cap is provided on the outer face of the neck.

A projection 7a is formed on the portion surrounding the base of the neck 4 and integrally connected with two strip-shaped projections 7b which extend downwardly onto the bottom of the bottle at the peripheral portions of the trunk generally diametrically opposed with each other. It should be appreciated that the trunk 2 which is thinner and somewhat weak is reinforced by the thick projections 7a and 7b which also serve as the projected or embossed patterns.

Figure 2:
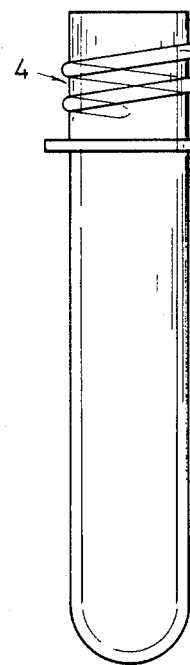
FIG. 2 is a front view of the parison used for molding the bottle.

The bottle made of a saturated polyester resin having the projections 7a and 7b may be formed by the following procedure. A parison 8 having an open upper end and a closed bottom end, as shown in FIG. 2, is molded through an injection molding using a saturated polyester resin as the molding material. The parison 8 has the thickness substantially even in its entirety, and provided with the neck 4, the thread 6 and the flange 5 concurrently formed at the injection molding step. In order to produce transparent parison 8, it is necessary to rapid cool the same immediately after molding step thereby to prevent crystallization resulting in whitening. As has been described hereinbefore, if the saturated polyester resin material is crystallized, the subsequent biaxial orientation which will be described hereinafter in detail, renders to be extremely difficult.

Figure 3:
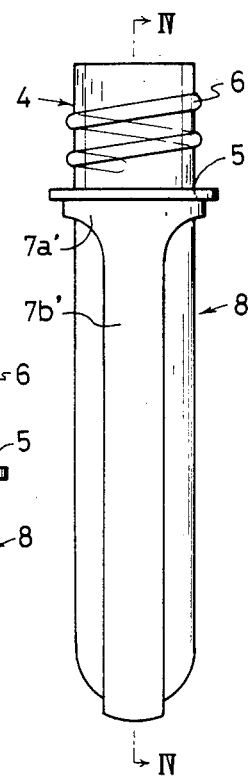
FIG. 3 is a front view of the parison with the welded strip.
Figure 4:
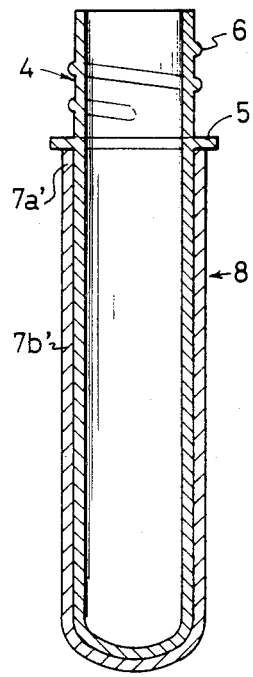
FIG. 4 is a sectional view taken along line IV—IV in FIG. 3.

The, strip-shaped pieces 7b' made of saturated polyester resin are welded on the outer face of the parison 5 at the diametrically opposed peripheral portions extending vertically from the edge of the flange 8 and an annular piece 7a' is similarly welded at the portion below the flange 5 so that the latter is surrounded by the annular piece 7a', as shown in FIGS. 3 and 4. While in the Figures there is shown a parison welded with strip-shaped pieces 7b' having the ends covering the bottom of the parison 8, the lengths of the strip-shaped pieces may be such that the bottom of the parison 8 is not covered by them. It is preferable to use the strip-shaped pieces 7b' and the annular piece 7a' colored by adding with a desired coloring agent for the ornament prupose.

The parison 8 thus welded with the strip-shaped pieces 7b' and the annular piece 7a' is then put in blow-mounding mould while being heated to a temperature for enabling biaxial orientation and yet caused by no whitening, and after the strip-shaped pieces and the annular piece are conjoined to form an integral piece the parison 8 is inflared while elongated in the longitudinal direction to form the bottle 1. In this operation, the annular piece 7a' and the strip-shaped pieces 7b' are fitted in recesses provided on the wall of the blow-molding mould, whereby they form, respectively, the projections 7a and 7b after the biaxial orientation operation. As a result, the projections 7a and 7b becomes thicker than the other portions of the bottle 1 to reinforce the latter. Since any recess or groove is not provided at the bottom of the mould, no projecting portion is formed at the bottom of the bottle.

If the outer face portions of predetermined locations are heated to a higher temperature during said step of heating the parison 8, such portions are crystallized to form whitened patterns.

As will be apparent from the foregoing description, the present invention is directed to a bottle made of saturated polyester resin and a method of making the same, wherein thicker projections 7a and 7b are formed on the trunk of the bottle, so that the bottle becomes strong even when the wall of the other portions of the bottle is thin. Moreover, the projections form embossed patterns which serve for the preferable ornaments. Further, according to the invention, the projections 7b or the like may be easily formed by welding the strip-shaped pieces 7b' made of the same material as that of the body portion of the bottle from a saturated polyester resin which is difficulty processed to form an embossed pattern. Furthermore, by using colored strip-shaped pieces 7b' or the like, more preferable colored projecting patterns may be formed.

What is claimed is:

1. A method of making a bottle of saturated polyester resin from an injection molded parison by biaxial orientation, comprising:

forming a parison of saturated polyester resin by injection molding, said parison having a neck portion, a trunk portion extending downwardly from the lower end of said neck portion, and a closed bottom portion;

preparing a piece of saturated polyester resin having an annular portion surrounding the lower end of said neck portion of said parison, and two opposed strip-shaped portions extending downwardly from said annular portion and conforming with the diametrically opposed sides of the trunk portion of said parison;

welding said piece on an outer face of said parison;

placing said welded piece and said parison in a mold having a recess for receiving said welded piece and heating said piece and said parison to a biaxially orientable temperature; and blow-molding said piece and said parison into contact with the mold such that said piece is received in said recess and said piece and said parison are elongated longitudinally simultaneously with the blow-molding, whereby said piece and said parison are shaped into a bottle of saturated polyester resin having biaxially oriented projections which extend vertically on the diametrically opposed side walls of said bottle and reinforce the same.

2. The method according to claim 1 wherein said step of forming the parison further includes forming a neck, a thread, and a flange which define the finished neck portion of said bottle, prior to welding said piece on said parison.

3. A method of making a bottle according to claim 1 wherein said parison is cooled rapidly to prevent undesirable crystallization.

4. A method of making a bottle according to claim 1 wherein said strip-shaped piece is colored.

* * * * *